Patented Mar. 14, 1939

2,150,380

UNITED STATES PATENT OFFICE 2,150,380

AZO DYESTUFFS

Arthur Howard Knight, Blackley, Manchester, England, assignor to Imperial Chemical Industries Limited, a corporation of Great Britain No Drawing. Application January 14, 1937, Serial No. 120,615. In Great Britain January 17, 1936

5 Claims. (Cl. 260—160)

This invention relates to the manufacture of azo dyestuffs and more particularly to secondary disazo dyestuffs.

This invention has as an object to manufacture new disazo dyestuffs. A further object is to provide new disazo dyestuffs which will combine good shades with good fastness to washing, milling and light. A still further object is to provide methods of making the new dyes. Further objects will be apparent from the following description.

These objects are accomplished by the following invention. I have discovered that I can manufacture new secondary disazo dyestuffs of the general formula A→M→E by diazotising a primary amine (A) of the benzene or naphthalene series carrying either a nuclear alkyl substituent of at least 10 and not more than 20 carbon atoms or the group —COOX, in which X is an aliphatic hydrocarbon group of at least 10 and not more than 20 carbon atoms, coupling with a primary amine (M) of the benzene or naphthalene series having a free para position to the amino group and thereafter diazotising the monoazo compound so formed and coupling with a coupling component (E) having at least one sulphonic acid group.

The first components used according to the present invention are, as will be seen, either esters of aliphatic alcohols of 10-20 carbon atoms or are compounds containing a nuclear alkyl substituent which are obtainable by using as a reagent at a convenient stage in their synthesis an aliphatic alcohol of 10-20 carbon atoms. These alcohols which are used as starting materials in the making of the said first components comprise dodecyl alcohol, otherwise known as dodecanol, tetradecyl alcohol, hexadecyl alcohol, octadecyl alcohol, all of which are saturated. Hexadecyl or cetyl alcohol is the main or sole component of the alcohols obtained by the saponification of spermaceti. If the alcohol obtained by the saponification of spermaceti is regarded as hexadecyl alcohol, its purity will depend upon the purity of the spermaceti which has been saponified. With low grade spermaceti the alcohol obtained is a mixture which may contain also oleyl alcohol. When the term cetyl is used in this specification it will be understood that it does not necessarily refer to pure cetyl alcohol.

The manufacture of aryl amines carrying as nuclear substituents aliphatic radicals of 10 to 20 carbons is illustrated by the following. Aniline or aniline substituted by methyl or chloro, or by both methyl and chloro, is heated with a saturated primary aliphatic alcohol having 10 to 20 carbons, the corresponding aniline or substituted aniline hydrochloride and a halide of zinc or cobalt. Alternatively, the compounds may be made by heating an aniline carrying as N-substituent one of the alkyl radicals referred to and which may be substituted by methyl or chloro, with a halide of zinc or cobalt. Suitable final reaction temperatures are about 230° to 240° C. When the substitution is completed, the reaction mixture is boiled with an excess of sodium hydroxide to decompose a double compound of the metal chloride which is formed during the reaction, and an oil containing the substituted product is separated. The compound may be obtained from the oil by distillation in vacuo. Para dodecylaniline is made by reacting dodecyl alcohol in the described process. Para dodecylaniline-m-sulfonic acid may be made by dissolving p-dodecylaniline in 100% sulphuric acid and then sulfonating by slowly adding fuming sulphuric acid (20% free SO₃), maintaining a temperature of about 10° to 15° C. When sulfonation is complete the p-dodecylaniline-m-sulfonic acid is precipitated by pouring the reaction mixture into ice water.

The invention is illustrated but not limited by the following examples, in which the parts are by weight.

Example I

A solution of 36.3 parts of the sodium salt of p-dodecylaniline-m-sulphonic acid (1-amino-4-dodecylbenzene-3-sulphonic acid, in 600 parts of warm water containing 6.9 parts of sodium nitrite is slowly added to 600 parts of ice-cold water containing 35 parts of 36% hydrochloric acid. The suspension is stirred until diazotisation is complete. The suspension of the diazo compound so obtained is then added to a solution of 15.3 parts of 2:5-dimethoxyaniline in 600 parts of water containing 10 parts of 36% hydrochloric acid. Coupling is facilitated by the addition of sodium acetate in sufficient amount to keep the coupling medium only just acid to Congo red paper. When coupling is complete the monoazo suspension is made just alkaline with sodium carbonate, 7 parts of sodium nitrite added, followed by 35 parts of 36% hydrochloric acid. The mixture is stirred for several hours to complete diazotisation and the suspension of the diazo compound then added to a solution at 0° C. of 36.1 parts of 1-acetylamino-8-naphthol-3:6-disulphonic acid kept alkaline to litmus with sodium carbonate during the addition. The new dyestuff is isolated by salting with 10% common salt (weight for volume), and dried. The new dyestuff has the formula

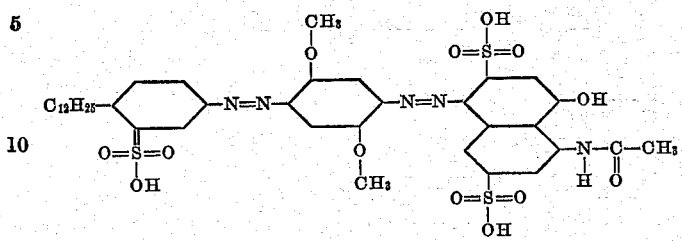

It dyes wool in violet shades of very good fastness to washing and milling.

*Example II*

36.3 parts of the sodium salt of 1-amino-4-dodecyl-benzene-3-sulphonic acid are diazotised as described in Example 1. The suspension of the diazo compound is then added to an ice-cold solution of 24.6 parts of the sodium salt of 1-naphthylamine-7-sulphonic acid in 300 parts of water. Sodium acetate is added from time to time during coupling in sufficient quantity to keep the coupling mixture only faintly acid to Congo red paper. When combination is complete, the suspension of the monoazo compound is made just alkaline to Clayton yellow paper by the addition of caustic soda, 40 parts of common salt and 7 parts of sodium nitrite are added, followed by 50 parts of 36% hydrochloric acid. When diazotisation is complete, the solid diazo compound is, if necessary, filtered off, washed with 5% brine and resuspended in 400 parts of water at 10° C. The diazo suspension is then added to a solution at 15° C. of 33.5 parts of the sodium salt of 1-p-tolylamino-naphthalene-8-sulphonic acid in 300 parts of water containing 16 parts of sodium acetate. When coupling is complete the dyestuff is made alkaline to brilliant yellow paper with caustic soda, heated to 50° C., and salted with 5% salt (weight for volume). The new dyestuff is filtered off and washed with 5% brine and, if necessary, further purified by re-suspending in water at 50–60° C., re-salting and filtering. The new dyestuff has the formula

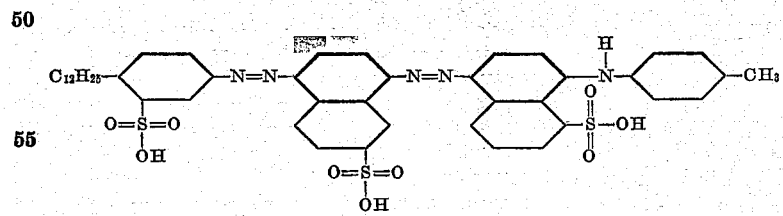

It dyes wool in greenish-navy blue shades of excellent fastness to washing and milling.

*Example III*

30.5 parts of dodecyl-p-aminobenzoate are diazotised as a fine suspension in 750 parts of water and 25 parts of 36% hydrochloric acid by the addition of 6.9 parts of sodium nitrite. The solution of the diazo compound so obtained, after filtering, if necessary, is added to a solution at 15° C. of 15.3 parts of 2:5-dimethoxyaniline in 600 parts of water containing 10 parts of 36% hydrochloric acid. The mixture is stirred until coupling is complete and then 7.0 parts of sodium nitrite are added. The diazotisation mixture is stirred for about four hours at 15–18° C. and the suspension of the diazoazo compound so obtained is then cooled to 5° C. and added to a solution at 5° C. of 25.4 parts of 1-(4'-sulphophenyl)-3-methyl-5-pyrazalone in 600 parts of water containing 4 parts of caustic soda and to which 21 parts of anhydrous sodium carbonate have been added. When coupling is complete the new diazo dyestuff is isolated by salting with 5% salt (weight for volume), filtering, and drying in any suitable way. The new dyestuff has the formula

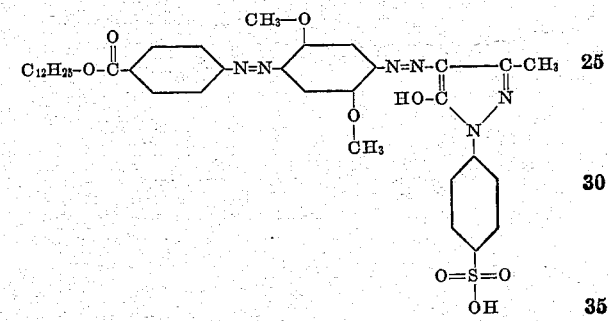

It dyes wool in orange-brown shades of a very good fastness to severe washing and milling.

If in the above example instead of 30.5 parts of dodecyl-p-aminobenzoate, there are used 36.1 parts of cetyl-p-amino-benzoate, a dyestuff is obtained having very similar properties.

*Example IV*

26.1 parts of p-dodecylaniline are diazotised in the known manner and the diazo solution so obtained added at 10° C. to a solution at 10° C. of 13.7 parts of 3-amino-4-methoxytoluene in 600 parts of water and 10 parts of 36% hydrochloric acid. Coupling is facilitated by the slow addition of aqueous sodium acetate to keep the mineral acidity of the coupling medium at a minimum.

After stirring for 24 hours the monoazo compound is filtered off, washed with 5% brine and re-suspended in 800 parts of water. 22 parts of 36% hydrochloric acid are then added, followed by 6.9 parts of sodium nitrite. Stirring is continued for about 3½ hours and the suspension of diazoazo compound so obtained is cooled to 5° C. and added to a solution at 5° C. of 32.3 parts of 1-(2':5'-dichloro-4'-sulphophenyl)-3-methyl-5-pyrazalone in 400 parts of water containing 4 parts of caustic soda and to which 24 parts of anhydrous sodium carbonate have been added. The new disazo dyestuff is isolated by salting with 5% salt (weight for volume), filtering and drying in any suitable way. The new dyestuff has the formula

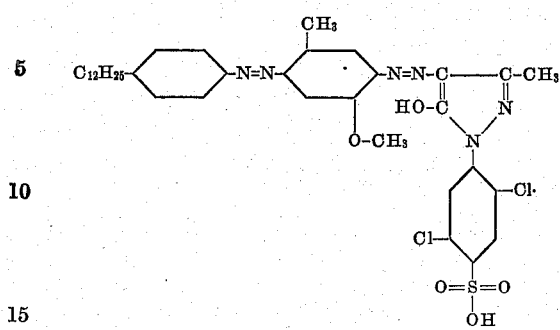

It dyes wool in orange shades of very good fastness to severe washing and milling.

The invention is further illustrated by the examples listed in the following table.

by reduction of the fatty acids of natural fats and oils (see here, for instance, Bouvaltt and Blanc, Bull. Soc. Chim, Series 3, vol. 31, page 1, pages 674 and 1210). The invention contemplates the use of first components obtainable from any of these alcohols, whether in the pure state or alcohols as obtained as mixtures from the fatty acids of natural fats and oils.

This invention is very useful in the art as it extends the range of secondary disazo dyestuffs, disclosing new dyestuffs which will dye from an acid or neutral bath, giving dyeings of a very high order of fastness to washing and milling.

As many apparently widely different embodiments of this invention may be made without departing from the spirit and scope thereof, it is to be understood that I do not intend to limit myself to the specific embodiments thereof except as defined in the appended claims.

Disazo dyestuff

| Example | First component (A) | Middle component (M) | Final component (E) | Shade on wool | Severe washing fastness | Milling fastness |
|---|---|---|---|---|---|---|
| 5 | p-Dodecylaniline-m-sulphonic acid. | 1-amino-2-ethoxynaphthalene-7-sulphonic acid. | 2-phenylamino-5-naphthol-7-sulphonic acid. | Navy blue | Very good | Very good. |
| 6 | ...Do... | 1-aminonaphthaene-7-sulphonic acid. | 1-phenylaminonaphthalene-8-sulphonic acid. | ...do... | ...do... | Do. |
| 7 | p-Dodecylaniline | ...do... | 1-p-tolylaminonaphthalene-8-sulphonic acid. | ...do... | ...do... | Do. |
| 8 | p-Dodecylaniline-m-sulphonic acid. | α-Naphthylamine | 2-phenylamino-8-naphthol-3:6-disulphonic acid. | Chocolate brown. | ...do... | Do. |
| 9 | p-Decylaniline | 3-amino-4-methoxy-toluene. | 1-(2':5'-dichloro-4'-sulphophenyl)-3-methyl-5-pyrazalone. | Orange | ...do... | Do. |
| 10 | Dodecyl m-aminobenzoate | 1-aminonaphthalene-7-sulphonic acid. | 1-p-tolylaminonaphthalene-8-sulphonic acid. | Navy blue | ...do... | Do. |
| 11 | p-Dodecylaniline-m-sulphonic acid. | 2:5-dimethoxyaniline | 1-(2':5'-dichloro-4'-sulphophenyl)-3-methyl-5-pyrazalone. | Orange brown | ...do... | Do. |
| 12 | ...Do... | 2:5-dimethoxyaniline | 2-amino-8-naphthol-6-sulphonic acid (coupled alkaline). | Deep brown | ...do... | Do. |
| 13 | p-Dodecylaniline | 3-amino-4-methoxytoluene. | 2-naphthol-3:6-disulphonic acid. | Purple | ...do... | Do. |
| 14 | p-Dodecylaniline-m-sulphonic acid. | 2:5-dimethoxyaniline | 1-aminonaphthalene-4-sulphonic acid. | Reddish brown | ...do... | Do. |

As the final coupling components (E) we may use, for example, naphthylamine sulphonic acids, naphthol sulphonic acids, aminonaphthol sulphonic acids or their N-substituted derivatives, sulphoarylpyrazalones or the like.

As middle components (M) we may use, for example, 3-amino-4-methoxytoluene, 2:5-dimethoxyaniline, 1-naphthylamine, 1-naphthylamine-6-, or 1-naphthylamine-7-sulphonic acids, 1-amino-2-ethoxynaphthalene-7-sulphonic acid and the like.

As first components (A) we may use, for example, p-dodecylaniline (i. e. 1-amino-4-dodecylbenzene), 5-dodecyl-2-aminotoluene, 5-dodecyl-2-chloroaniline, p-decylaniline, p-hexadecylaniline, 1-amino-4-dodecylbenzene-3-sulphonic acid, 3-nitro-1-amino-4-dodecylbenzene, dodecyl-4-aminobenzoate, dodecyl-3-aminobenzoate, cetyl-4-aminobenzoate, dodecyl-3-amino-4-methylbenzoate, dodecyl-3-amino-4-methoxybenzoate.

First components used according to the invention are not limited to those derived from the alcohols mentioned above, although in technical practice there is at present an economic limitation to alcohols containing an even number of carbon atoms. Dodecyl and tetradecyl alcohols are obtainable by reduction of the fatty acids obtained from coconut oil and palm oil. Other alcohols, e. g. "olein" or oleyl alcohol (better to be known as octadecenol) are likewise obtainable

I claim:
1. A compound represented by the formula

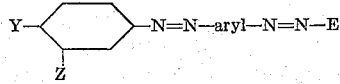

in which Y is one of the group consisting of an aliphatic group containing 10 to 20 carbon atoms and a group COOX where X is an aliphatic group containing 10 to 20 carbon atoms, Z is one of the group consisting of hydrogen nitro and sulfonic acid, aryl is a radical of a primary amine from the group consisting of amino-benzene and naphthylamine compounds which is coupled para to the amino group thereof, and E is the radical of an azo dye coupling component containing at least one sulfonic acid group from the group consisting of naphthylamine sulfonic acids, naphthol sulfonic acids, amino-naphthol-sulfonic acids, N-substituted naphthalene sulfonic acids, N-substituted-naphthol-sulfonic acids and phenyl pyrazolone-sulfonic acids, said N-substituted compounds having the radical

in which R is one of the group consisting of acyl and aryl of the benzene series.

2. A compound represented by the formula

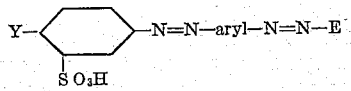

in which Y is one of the group consisting of the radicals

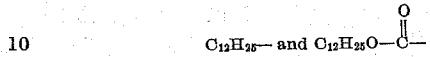

aryl is a radical of a primary amine from the group consisting of amino-benzene and naphthylamine compounds which is coupled para to the amino group thereof, and E is the radical of an azo dye coupling component containing at least one sulfonic acid group from the group consisting of naphthylamine sulfonic acids, naphthol sulfonic acids, amino-naphthol-sulfonic acids, N-substituted naphthalene sulfonic acids, N-substituted naphthol-sulfonic acids and phenyl pyrazolone-sulfonic acids, said N-substituted compounds having the radical

in which R is one of the group consisting of acyl and aryl of the benzene series.

3. A compound represented by the formula

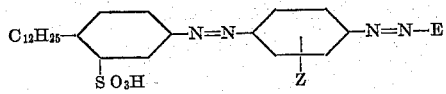

in which Z is at least one of the group consisting of alkyl and alkoxy, and E is the radical of an azo dye coupling component containing at least one sulfonic acid group from the group consisting of naphthylamine sulfonic acids, naphthol sulfonic acids, amino-naphthol-sulfonic acids, N-substituted naphthalene sulfonic acids, N-substituted naphthol-sulfonic acids and phenyl pyrazolone-sulfonic acids, said N-substituted compounds having the radical

in which R is one of the group consisting of acyl and aryl of the benzene series.

4. Secondary disazo dyestuffs having the general formula A →M →E obtainable by diazotizing a primary aryl amine, A represented by the formula

in which $NH_2$ is in one of the positions meta and para to X, X is one of the group consisting of alkyl and the group

in which there are 10 to 20 carbon atoms in the alkyl radical, and Y is one of the group consisting of hydrogen, alkyl, alkoxy, chloro, nitro and sulfonic acid, and in which nitro and sulfonic acid are in adjacent positions to X in the aryl nucleus, and amino is in an adjacent position to one of the group consisting of alkyl, alkoxy and chloro in the aryl nucleus; coupling with a primary aryl amine (M) of the group consisting of amino benzenes and naphthylamines which have a free coupling position para to the amino group; and thereafter diazotizing the monazo compound so formed, and coupling with a coupling component (E) which has at least one sulfonic acid, said coupling component being one of the group consisting of naphthylamine sulfonic acids, naphthol sulfonic acids, amino-naphthol sulfonic acids, phenyl pyrazolone sulfonic acids, N-substituted naphthalene sulfonic acids, and N-substituted naphthol sulfonic acids, said N-substituted compounds having the radical

in which R is one of the group consisting of acyl and aryl of the benzene series.

5. The process of manufacturing new disazo dyestuffs represented by the general formula A →M →E which comprises diazotizing a primary aryl amine, A represented by the formula

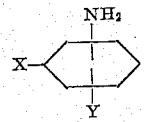

in which $NH_2$ is in one of the positions meta and para to X, X is one of the group consisting of alkyl and the group

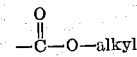

in which there are 10 to 20 carbon atoms in the alkyl radical, and Y is one of the group consisting of hydrogen, alkyl, alkoxy, chloro, nitro and sulfonic acid, and in which nitro and sulfonic acid are in adjacent positions to X in the aryl nucleus, and amino is in an adjacent position to one of the group consisting of alkyl, alkoxy and chloro in the aryl nucleus; coupling with a primary aryl amine (M) of the group consisting of amino benzenes and naphthylamines which have a free coupling position para to the amino group; and thereafter diazotizing the monazo compound so formed, and coupling with a coupling component (E) which has at least one sulfonic acid, said coupling component being one of the group consisting of naphthylamine sulfonic acids, naphthol sulfonic acids, amino-naphthol sulfonic acids, phenyl pyrazolone sulfonic acids, N-substituted naphthalene sulfonic acids, and N-substituted naphthol sulfonic acids, said N-substituted compounds having the radical

in which R is one of the group consisting of acyl and aryl of the benzene series.

ARTHUR HOWARD KNIGHT.